US012652460B2

(12) United States Patent
Wan et al.

(10) Patent No.: US 12,652,460 B2
(45) Date of Patent: Jun. 9, 2026

(54) IMAGE ACQUISITION METHOD FOR INFORMATION INPUT PAGE, IN PREVIEW MODE INCLUDING INFORMATION INTERACTION AREA AND SMALLER PREVIEW AREA

(71) Applicant: Beijing Zitiao Network Technology Co., Ltd., Beijing (CN)

(72) Inventors: Shiqi Wan, Beijing (CN); Siqi Shu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/948,931

(22) Filed: Nov. 15, 2024

(65) Prior Publication Data

US 2025/0071411 A1     Feb. 27, 2025

Related U.S. Application Data

(63) Continuation of application No. PCT/CN2023/098921, filed on Jun. 7, 2023.

(30) Foreign Application Priority Data

Jun. 8, 2022     (CN) .......................... 202210645079.8

(51) Int. Cl.
H04N 23/63 (2023.01)
G06F 3/04845 (2022.01)

(52) U.S. Cl.
CPC ....... H04N 23/632 (2023.01); G06F 3/04845 (2013.01)

(58) Field of Classification Search
None
See application file for complete search history.

(56) References Cited

U.S. PATENT DOCUMENTS 10,284,812 B1 *  5/2019  Van Os ................. H04L 51/046
11,178,335 B2 * 11/2021  Van Os ................. G06F 3/0304
(Continued)

FOREIGN PATENT DOCUMENTS

CN      106293473 A    1/2017
CN      106502527 A    3/2017
(Continued)

OTHER PUBLICATIONS

ISA China National Intellectual Property Administration, International Search Report and Written Opinion Issued in Application No. PCT/CN2023/098921, Aug. 21, 2023, WIPO, 15 pages.
(Continued)

*Primary Examiner* — Henry Orr
(74) *Attorney, Agent, or Firm* — Alleman Hall LLP

(57) ABSTRACT

The present disclosure relates to an image acquisition method and apparatus for an information input page, and a device, a storage medium and a program product. The method comprises: presenting the information input page in a first preview mode, in response to a first operation on the information input page, wherein the information input page in the first preview mode comprises an information interaction area and a first preview area, the first preview area is configured to display a preview image added by a current user and a size of the first preview area is smaller than a size of the information input page; and acquiring a target image corresponding to a trigger operation, in response to the trigger operation on the information input page, wherein the target image is configured to be presented in the information interaction area.

20 Claims, 6 Drawing Sheets

(56) References Cited

U.S. PATENT DOCUMENTS

| | | | |
|---|---|---|---|
| 2013/0055083 A1* | 2/2013 | Fino | G06F 3/04886 715/716 |
| 2014/0055552 A1* | 2/2014 | Song | H04L 12/1818 348/14.02 |
| 2014/0208237 A1* | 7/2014 | Happonen | G06F 3/0488 715/753 |
| 2016/0132231 A1* | 5/2016 | Rathod | G06F 3/16 715/727 |
| 2016/0248864 A1* | 8/2016 | Loia | G06Q 50/01 |
| 2017/0336960 A1* | 11/2017 | Chaudhri | H04L 51/18 |
| 2018/0088764 A1 | 3/2018 | Lu et al. | |
| 2018/0088787 A1* | 3/2018 | Bereza | G06F 3/04815 |
| 2018/0321826 A1* | 11/2018 | Bereza | G06F 3/04883 |
| 2018/0364827 A1 | 12/2018 | Chung | |
| 2021/0373750 A1* | 12/2021 | Manzari | G06F 3/0488 |
| 2022/0057931 A1* | 2/2022 | Zhu | G06F 3/04883 |
| 2022/0244838 A1* | 8/2022 | Bereza | G06F 3/04815 |
| 2022/0264028 A1 | 8/2022 | Manzari et al. | |
| 2022/0391073 A1* | 12/2022 | Cranfill | G06F 3/04842 |
| 2022/0393997 A1* | 12/2022 | Hong | G06F 3/0482 |

FOREIGN PATENT DOCUMENTS

| | | | |
|---|---|---|---|
| CN | 107454324 A | 12/2017 | |
| CN | 107528938 A | 12/2017 | |
| CN | 108170348 A | 6/2018 | |
| CN | 109840126 A | 6/2019 | |
| CN | 110543579 A | 12/2019 | |
| CN | 111510760 A | 8/2020 | |
| CN | 112073769 A | 12/2020 | |
| CN | 113010063 A | 6/2021 | |
| EP | 3364330 A1 | 8/2018 | |
| EP | 3979100 A1 | 4/2022 | |
| JP | 2007020147 A | 1/2007 | |
| WO | 2016145831 A1 | 9/2016 | |
| WO | 2020248640 A1 | 12/2020 | |
| WO | 2020248680 A1 | 12/2020 | |
| WO | 2021061435 A1 | 4/2021 | |

OTHER PUBLICATIONS

Notice of Reasons for Refusal for Japanese Application No. 2024-570316, mailed May 20, 2025, 10 pages.

China National Intellectual Property Administration, Office Action and Search Report Issued in Application No. 202210645079.8, Apr. 1, 2026, 20 pages.

European Patent Office, Office Action Issued in Application No. 23819179.5, Apr. 2, 2026, Germany, 9 pages.

Pudding Isn't as Sweet as You, My Safety Society, "Ideal Circle Exchange," sspai.com, Available Online at https://sspai.com/post/62767, Aug. 25, 2020, 31 pages. See NPL No. 1, Chinese Office Action issued in app No. 202210645079.8 for explanation of relevance.

* cited by examiner

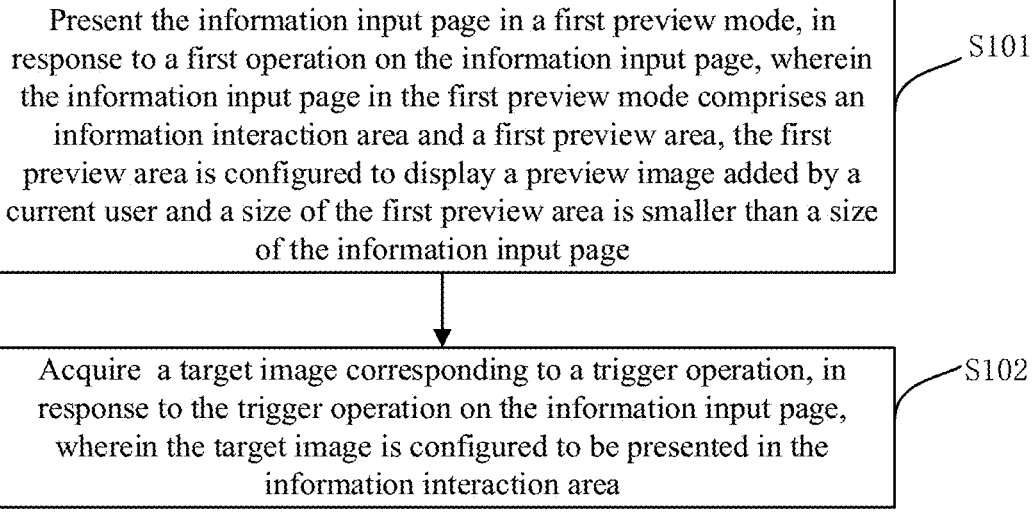

Present the information input page in a first preview mode, in response to a first operation on the information input page, wherein the information input page in the first preview mode comprises an information interaction area and a first preview area, the first preview area is configured to display a preview image added by a current user and a size of the first preview area is smaller than a size of the information input page ⟋S101

Acquire a target image corresponding to a trigger operation, in response to the trigger operation on the information input page, wherein the target image is configured to be presented in the information interaction area ⟋S102

Fig.1

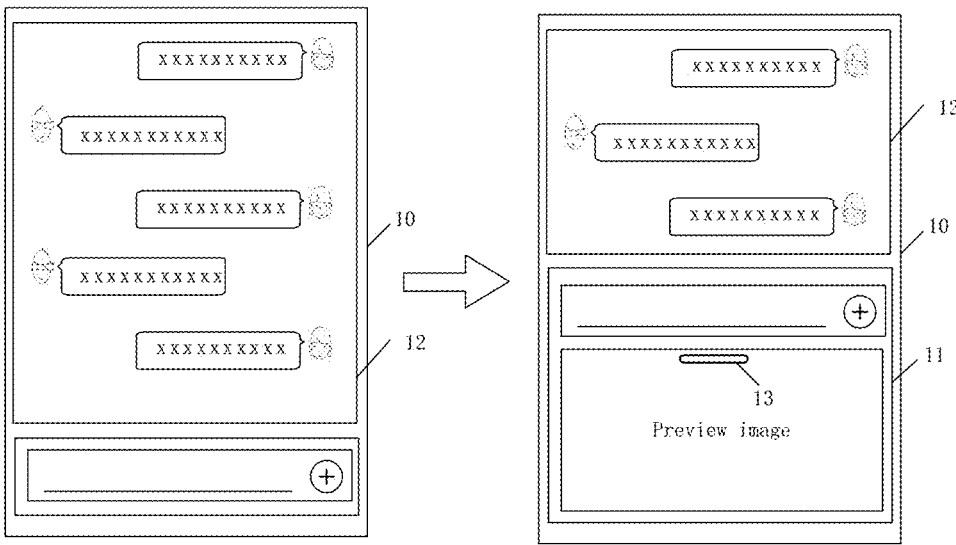

Fig.2

IMAGE ACQUISITION METHOD FOR INFORMATION INPUT PAGE, IN PREVIEW MODE INCLUDING INFORMATION INTERACTION AREA AND SMALLER PREVIEW AREA

CROSS-REFERENCE TO RELATED APPLICATIONS

This application claims the priority of Chinese Application for Invention No. 202210645079.8, filed on Jun. 8, 2022, the disclosure of which is hereby incorporated into this disclosure by reference in its entirety.

TECHNICAL FIELD

This disclosure relates to the field of computer processing technology, particularly to an image acquisition method and apparatus for an information input page, a device, a storage medium, and a program product.

BACKGROUND

With the continuous development of the Internet and terminal technology, electronic devices are more and more widely used in our daily lives. People can enter information into electronic devices for human-machine interaction or to interact with others.

During a process of information interaction on an information input page, an information sending end can send an image captured by a camera as a message to an information receiving end. In related technologies, when capturing an image with a camera, it is usually necessary to redirect to a photography page, and the image described above is displayed on a full screen of the electronic device.

SUMMARY

In a first aspect, some embodiments of the present disclosure provides an image acquisition method for an information input page, comprising:

presenting the information input page in a first preview mode, in response to a first operation on the information input page, wherein the information input page in the first preview mode comprises an information interaction area and a first preview area, the first preview area is configured to display a preview image added by a current user and a size of the first preview area is smaller than a size of the information input page; and acquiring a target image corresponding to a trigger operation, in response to the trigger operation on the information input page, wherein the target image is configured to be presented in the information interaction area.

In a second aspect, some embodiments of the present disclosure provides an image acquisition apparatus for an information input page, comprising:

a page presentation module configured to present the information input page in a first preview mode, in response to a first operation on the information input page, wherein the information input page in the first preview mode comprises an information interaction area and a first preview area, the first preview area is configured to display a preview image added by a current user and a size of the first preview area is smaller than a size of the information input page; and an image acquisition module configured to acquire a target image corresponding to a trigger operation, in response to the trigger operation on the information input page, wherein the target image is configured to be presented in the information interaction area.

In a third aspect, some embodiments of the present disclosure provides an electronic device, comprising:

one or more processors;

a storage device for storing one or more programs that, when executed by the one or more processors, cause the one or more processors to implement the image acquisition method for the information input page according to any embodiment of the first aspect.

In a fourth aspect, some embodiments of the present disclosure provides a non-transitory computer-readable medium having stored thereon a computer program that, when executed by a processor, causes the processor to implement the image acquisition method for the information input page according to any embodiment of the first aspect.

BRIEF DESCRIPTION OF THE DRAWINGS

The above and other features, advantages, and aspects of the embodiments of the present disclosure will become more apparent from the following embodiments with reference to the drawings. Throughout the drawings, the same or similar reference signs indicate the same or similar elements. It should be understood that the drawings are schematic and the components and elements are not necessarily drawn to scale.

FIG. 1 is a flowchart of an image acquisition method for an information input page according to some embodiments of the present disclosure;

FIG. 2 is a schematic diagram of an information input page displayed in a first preview mode according to some embodiments of the present disclosure;

DETAILED DESCRIPTION

Figure 3:
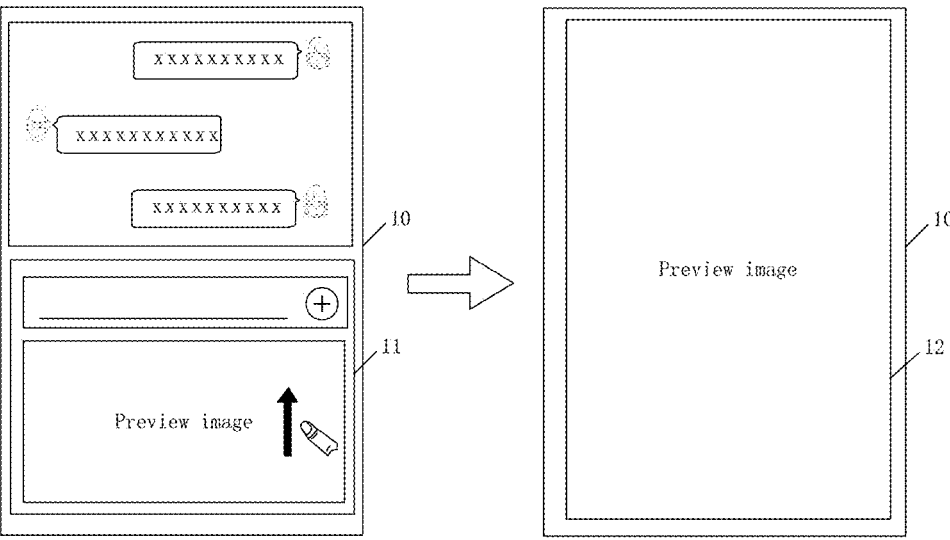
FIG. 3 is a schematic diagram of a full-screen preview image triggered by a slide-up operation according to some embodiments of the present disclosure.

Exemplary embodiments of the present disclosure will now be described in detail with reference to the accompanying drawings. Although some embodiments of the present disclosure are shown, it should be understood that the present disclosure can be implemented in various forms, and should not be construed as being limited to the embodiments set forth herein. On the contrary, these embodiments are provided for a more thorough and complete understanding of the present disclosure. It should be understood that the drawings and embodiments of the present disclosure are only used for exemplary purposes, and are not used to limit the scope of protection of the present disclosure.

It should be understood that the various steps described in the methods of the embodiments of the present disclosure may be executed in a different order, and/or executed in parallel. In addition, the methods may comprise additional steps and/or some of the illustrated steps may be omitted. The scope of this disclosure is not limited in this regard.

The term "comprising" and its variants as used herein is an open-ended mode expression, that is, "comprising but not limited to". The term "based on" means "based at least in part on". The term "one embodiment" means "at least one embodiment"; The term "another embodiment" means "at least one additional embodiment"; The term "some embodiments" means "at least some embodiments". Related definitions of other terms will be given in the following description.

It should be noted that the concepts of "first" and "second" mentioned in the present disclosure are only used to distinguish different devices, modules or units, and are not used to limit the order of functions performed by these devices, modules or units, or interdependence therebetween.

It should be noted that the modifications of "a" and "a plurality of" mentioned in the present disclosure are illustrative and not restrictive, and those skilled in the art should understand that unless clearly indicated in the context, they should be understood as "one or more".

The names of messages or information exchanged between multiple devices in the embodiments of the present disclosure are only used for illustrative purposes, and are not used to limit the scope of these messages or information.

In related technologies, displaying the above image on a full screen of an electronic device may affect a viewing of interaction information of a user.

To address the above technical problem, some embodiments of the present disclosure provides an image acquisition method and apparatus for an information input page, a device, a storage medium, and a program product, which enable simultaneous display of a preview image and an information interaction area, thereby facilitating the viewing of the user and improving the user's experience.

The image acquisition method and apparatus for an information input page, the device, the storage medium, and the program product provided in the embodiments of the present disclosure can be applied to any information input scenario.

The above information input scenario can comprise entering an message in an instant messaging application, a live streaming application, an information search application, a game application, a shopping application, a document editing application, or an audio and video application, etc. It should be noted that in some embodiments of the present disclosure, an information interaction scenario in an instant messaging application is used as an example for illustration. With reference to the accompanying drawings, the image acquisition method for the information input page provided by some embodiments of the present application will be described in detail below.

FIG. 1 is a flowchart of an image acquisition method for an information input page according to some embodiments of the present disclosure. The embodiments can be applicable to previewing and acquiring an image on an information input page. The image acquisition method can be performed by an image acquisition apparatus for an information input page, which can be implemented in software and/or hardware, and can be configured in an electronic device.

For example, the electronic device can be a mobile terminal, a fixed terminal or a portable terminal, such as a mobile phone, a website, a unit, a device, a multimedia computer, a multimedia tablet, an Internet node, a communicator, a desktop computer, a laptop computer, a netbook computer, a tablet computer, a personal communication system (PCS) device, a personal navigation device, a personal digital assistant (PDA), an audio/video player, a digital camera/video camera, a positioning device, a television receiver, a radio broadcast receiver, an e-book device, a gaming device or any combination thereof, comprising accessories and peripherals of these devices or any combination thereof.

For another example: the electronic device may be a server, wherein the server can be a physical server or a cloud server; the server can be a server, or a server cluster.

As shown in FIG. 1, the image acquisition method for the information input page provided in this embodiment mainly comprises steps S101 to S102.

In S101, the information input page is presented in a first preview mode, in response to a first operation on the information input page, wherein the information input page in the first preview mode comprises an information interaction area and a first preview area, the first preview area is configured to display a preview image added by a current user and a size of the first preview area is smaller than a size of the information input page.

When the user interacts with an application in an electronic device, the application will display the information input page of the application to the user on a display screen of the electronic device. The information input page displayed by the application to the user mainly comprises the information interaction area and an information input area. The information interaction area, also known as an information interaction window, is mainly used to display various types of interaction information between an information sending end and an information receiving end. The above interaction information may be one or more of text information, image information, video information, an emoticon, an online document, an offline document, and other types of information. The information input area is mainly used to receive the various interaction information described above.

The first operation described above can be understood as a trigger operation for adding an image. For example, when the user at the information sending end wants to send an image and/or video currently captured by a camera to the information receiving end, the first operation can be a trigger operation on a shooting control on the information input page, and the first preview area displays a real-time preview image captured by the current user. The images in this disclosure comprise images and/or videos.

In some embodiments, the interaction area of the preview image is displayed in an image preview mode on the information input page. The image preview mode comprises the first preview mode and a second preview mode, wherein the first preview mode can be understood as a mode in which the preview image is displayed in a part of the information input page, and the second preview mode can be entire information input page, and is also known as the full-screen preview mode.

In some embodiments of the present disclosure, the image preview mode may be determined as follows: obtaining a default image preview mode of the application. For example, the application may have the default image preview mode, which is the first preview mode.

In some embodiments of the present disclosure, the image preview mode may be determined as follows: obtaining the image preview mode set by the user a last time the application was closed.

In some embodiments of the present disclosure, the first preview area may be any area in the information input page that is smaller than the size of the information input page, and a position of the first preview area is not specifically limited in the embodiments.

In some embodiments of the present disclosure, the size and position of the first preview area may be adjusted in response to an operation of the user on the first preview area. For example, the position of the first preview area can be adjusted in response to a drag-and-drop operation of the user on the first preview area. The adjusted position can be determined based on a position corresponding to the end of the drag-and-drop operation, and is not be specifically limited in the embodiments.

In some embodiments, borders of the first preview area may be adjusted in response to a selection operation of the user on the first preview area. Furthermore, upon a selection of the first preview area, in response to a drag-and-drop operation on one of the borders of the first preview area, a position of that border can be changed. In the embodiments, a method of adjusting the first preview area is not specifically limited.

The presenting the information input page in the first preview mode (i.e., displaying the information interaction area and the first preview area on the information input page) in response to the first operation on the information input page comprises: replacing a portion of the information interaction area of the information input page with the first preview area and reducing a size of the information interaction area, in response to the first operation on the information input page.

As shown in FIG. 2, in response to the first operation on the information input page, in a case where the image preview mode is the first preview mode, a portion of the information interaction area 12 on the information input page 10 is replaced with the first preview area 11, and the information interaction area 12 is reduced. The preview image is displayed in the first preview area 11. In some embodiments, the size of the first preview area may be consistent with a size and/or position of an emoji display panel in the application.

It should be noted that the preview image in FIG. 2 is a preview image in a shooting scenario. In the shooting scenario, one preview image is displayed in the first preview area 11, which is an image currently captured by a camera. In some embodiments, a user can simultaneously or sequentially capture a plurality of preview images in an interaction area of preview images. The plurality of preview images are displayed in the first preview area 11.

In some embodiments of the present disclosure, interaction information of the user is displayed in the information interaction area in an upper part of the information input page, and the preview image is displayed in the first preview area in a lower part of the information input page. This allows the preview image and the interaction information to be displayed simultaneously on a same page, thereby facilitating viewing by the user.

In some embodiments of the present disclosure, the image acquisition method further comprises: switching the information input page from the first preview mode to a second preview mode, in response to a second operation on the first preview area, in a case where the information input page is presented in the first preview mode; and displaying the preview image in a second preview area, wherein a size of the second preview area is equal to the size of the information input page.

The second preview mode can be understood as a mode in which the preview image is presented in the entire information input page, and also known as the full-screen preview mode.

In some embodiments of the present disclosure, the second operation comprises at least one of: a trigger operation on a target control within the first preview area, or a slide operation in a first direction within the first preview area.

In a case where the first preview area is located at lower part of the information input interface, the slide operation in the first direction can be a slide-up operation. In some embodiments, in response to the slide-up operation on the first preview area, a slide distance corresponding to the slide operation is obtained. If the slide distance exceeds a preset distance threshold, the image preview mode is switched from the first preview mode to the second preview mode. The preset distance threshold can be set according to actual situations. For example, the preset distance threshold is a quarter of a length of a vertical border of the first preview area.

The target control is a control for switching the image preview mode, which is provided in the first preview area. A target control 13 shown in FIG. 2 is located at a top of the first preview area.

In the embodiments, image preview mode can be switched by a simple and convenient operation, such as triggering a target control or sliding a preset distance against the first preview area.

In some embodiments of the present disclosure, as shown in FIG. 3, in a case where the image preview mode is the first preview mode, in response to a slide-up operation on the first preview area 11, the image preview mode is switched from the first preview mode to the second preview mode to display the preview image in the entire information input page 10. In other embodiments of the present disclosure, switching from the first preview mode to the second preview mode may also be accomplished by a slide operation on a target control. It can be understood that the slide operation is to slide in a direction that expands the first preview area.

In some embodiments of the present disclosure, the image preview mode can be freely switched in a convenient and fast manner by an operation performed on the information input page.

In some embodiments of the present disclosure, the image acquisition method further comprises: in response to a third operation on the information input page, replacing the first preview area of the information input page with at least a portion of the information interaction area and increasing a size of the information interaction area.

In the embodiments of the present disclosure, regardless of whether the image preview mode is the first preview mode or the second preview mode, the image preview mode can be disabled in response to the third operation on the information input page.

In some embodiments, in the first preview mode, after an acquisition operation of the target image is completed, the first preview area is not automatically closed, and the current user can continue to perform another image preview and acquisition operation. For example, in response to the user triggering a shooting control on the information input page, the first preview area displays a real-time preview image captured by the current user with a camera. In this case, the user can click on a shooting control in the first preview area to obtain a current preview image as the target image and send it to the information receiving end. After the target image is sent, the first preview area still displays a real-time preview image captured by the current user with the camera, and the user can perform a target image acquisition and transmission operation again. In other embodiments, it is also possible to provide the user with a confirmation option after the user clicks on the shooting control, so that the user can choose to send or cancel sending.

In the second preview mode, the display of the second preview area can be retained after the acquisition operation of the target image is completed, or the preview mode can be switched to the first preview mode after the acquisition operation of the target image is completed. Closing the image preview mode can be understood as no longer displaying the first preview area on the information input page, i.e., replacing the first preview area with at least a portion of the information interaction area and expanding the information interaction area to the entire information input page. That is, the information input page on the information sending end is restored to its normal display form. For example, an information input panel may be closed to display the information interaction area and a text input control on the information input page, as shown on the left side of FIG. 2.

In the embodiments of the present disclosure, it is possible to no longer display the preview image and only display a normal information input page by an operation on the information input page, thereby facilitating the user to input other information.

In some embodiments of the present disclosure, the third operation comprises at least one of: a trigger operation on a preset control in the information interaction area, or a slide operation in a second direction in the first preview area.

In some embodiments, the preset control comprises one or more of: a shooting control, an album control, an input control, an emoji adding control, etc. The shooting control is used to instruct a camera of an electronic device to shoot an image/video and send it to the information receiving end according to a subsequent operation; the album control is used to display images stored in a local album of the electronic device and send an image to the information receiving end according to a subsequent operation; the emoji adding control is used to display emojis that can be added in the application and send an emoji to the information receiving end according to a subsequent operation of the user.

The slide operation in the second direction is a slide-down operation. In some embodiments, in response to the slide-down operation on the first preview area, a slide distance corresponding to the slide-down operation is obtained, and the image preview mode is disabled in response to the slide distance exceeding a preset distance threshold. The preset distance threshold can be set according to actual situations. For example, the preset distance threshold is a quarter of a length of a vertical border of the first preview area.

It should be noted that the image preview mode can be disabled in response to any of the above operations.

In the embodiments of the present disclosure, a plurality of operations are provided to disable the image preview mode for a convenience of the user.

In S102, a target image corresponding to a trigger operation is acquired, in response to the trigger operation on the information input page, wherein the target image is configured to be presented in the information interaction area.

The trigger operation on the information input page can be understood as an operation to acquire and send the preview image. In a shooting scenario, the acquiring the target image corresponding to the trigger operation can comprises capturing the preview image as the target image via a camera of an electronic device. The target image may comprise a single image and/or video.

In some embodiments of the present disclosure, in response to the trigger operation on the information input page, the target image is acquired and directly sent to the information receiving end, and the target image is displayed in the information interaction area on the information sending end. In this way, the target image is directly acquired and sent in response to the trigger operation, thereby achieving instant shooting and sending, and the operation process is simple and convenient.

In some embodiments of the present disclosure, the image acquisition method further comprises: setting a view number for the target image, in response to a trigger operation on a view number control in the first preview area, wherein the view number is configured to recall the target image in response to a number of times the target image that has been viewed on the information receiving end reaching the view number.

In the embodiments of the present disclosure, the view number can be set according to actual situations. For example, the view number can be set to 1. The view number control is a view-only-once control.

Figure 4:
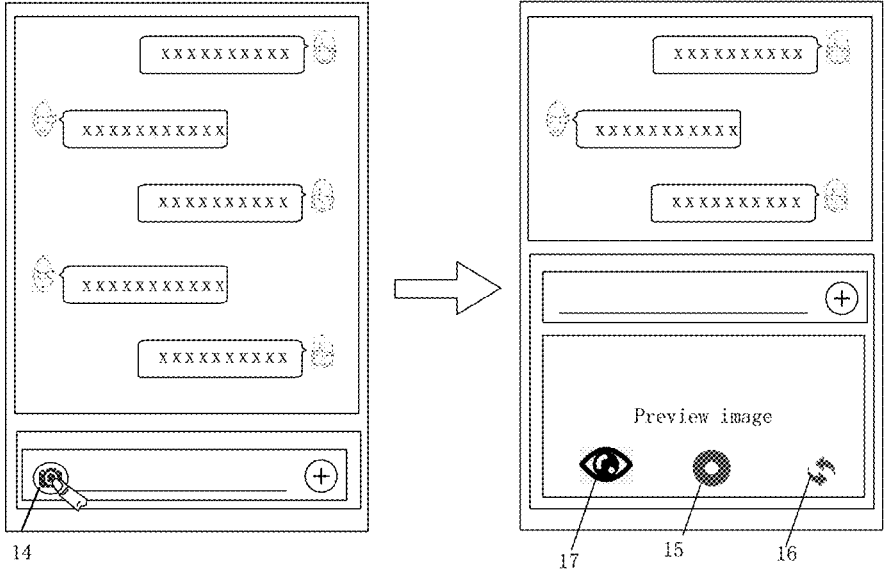
FIG. 4 is a schematic diagram of a preview image displayed by triggering a shooting control according to some embodiments of the present disclosure.

In some embodiments of the present disclosure, as shown in FIG. 4, in response to a trigger operation on a view-only-once control 17 in the first preview area, the view number is set to 1 for the target image. The target image is recalled when it is detected that the preview image has been viewed one time on the information receiving end. This can improve information security.

In some embodiments of the present disclosure, the acquiring a target image corresponding to a trigger operation, in response to the trigger operation on the information input page comprises: controlling a camera to capture the preview image as the target image, in response to a trigger operation on a shooting control on the information input page.

The shooting control can be provided in the first preview area or the information interaction area, which is not specifically limited in this embodiment.

As shown in FIG. 4, in response to a trigger operation on the shooting control 14 comprised in the information input page, a preview image is displayed in the first preview area 11 for photographing preview. The preview image in the first preview area can be an image captured by a front camera or an image captured by a rear camera. For example, a camera used by the user the last time the application was closed is determined and used to capture the preview image. If the camera used the last time the application was closed cannot be determined, a default camera is used to capture the preview image. For example, the default camera may be the rear camera.

In some embodiments, in response to a trigger operation on a shooting control 15 in the first preview area, a photo is taken to obtain the target image corresponding to the trigger operation. The information sending end can directly send the target image to the information receiving end and display the target image in the information interaction area, achieving instant shooting and sending. After the information sending end acquires the target image, it can also directly display the target image in an input box with a first size, and receive the input information entered by the user. The target image and input information are sent as a session message to the information receiving end.

As shown in FIG. 4, a view-only-once control 17 and the shooting control 15 are displayed on the information input page. In response to a trigger operation of the user on the view-only-once control 17, the captured preview image is set to be viewed for only once. After the target image is viewed once on the information receiving end, it is recalled by the information sending end.

In some embodiments of the present disclosure, the image acquisition method further comprises: switching between a front camera and a rear camera in response to a trigger operation on a camera switch control in the first preview area.

In some embodiments of the present disclosure, as shown in FIG. 4, a camera switch control 16 is displayed on the information input page. In a case where the current camera is a front camera, the current camera is switched to a rear camera in response to a trigger operation on the camera switch control 16. In a case where the current camera is the rear camera, the current camera switched to the front camera in response to a trigger operation on the camera switch control 16.

In some embodiments of the present disclosure, switching between the front camera and the rear camera is accomplished by the camera switch control 16, which is simple and easy to operate.

In some embodiments of the present disclosure, the acquiring a target image corresponding to a trigger operation, in response to the trigger operation on the information input page comprises: starting to record a video, in response to a long press operation on the shooting control; stopping recording the video, in response to detecting that the long press is completed; and acquiring a target video corresponding to the long press operation.

In some embodiments of the present disclosure, a completion of the long press operation may be detected by detecting that the user is no longer performing a press operation on the shooting control 15, or that the long press operation on the shooting control 15 exceeds a preset duration. For example, the preset duration is 15 seconds.

In the embodiments of the present disclosure, the video is started to be recorded in response to the long press operation on the shooting control; in response to detecting that the long press operation is completed, the video is stopped being recorded to acquire the target video taken during the long press operation.

It should be noted that the target video can be set to be viewed for only once, or added to an input box and sent as a session message along with input information to the information receiving end. Alternatively, the information sending end can send the target video directly to the information receiving end and display the target video in the information interaction area, achieving instant shooting and sending. A cover image of the target video is displayed in the information interaction area, which can be any video frame in the target video. For example, the cover image is a first video frame in the target video. Specifically, reference can be made to the description of the above embodiments, which will not be repeated in the embodiments.

In some embodiments of the present disclosure, a video recording and sending method, which can achieve instant recording and sending of videos to improve user experience.

Figure 5:
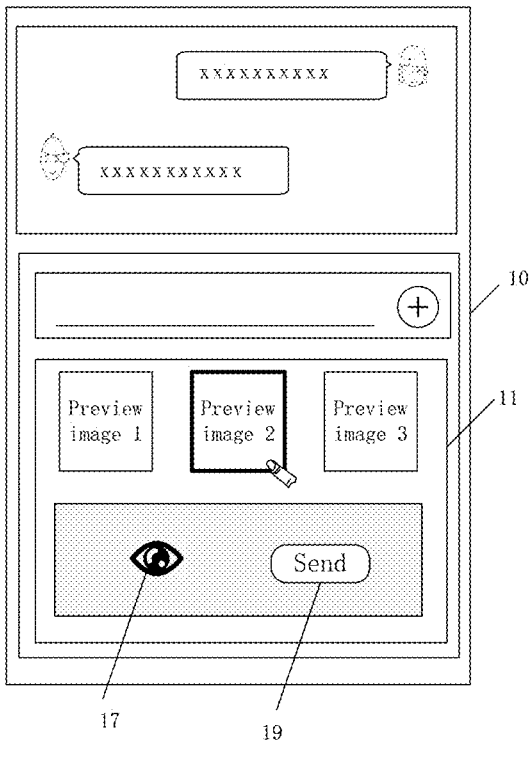
FIG. 5 is a schematic diagram of sending a target image according to some embodiments of the present disclosure.

In some embodiments of the present disclosure, a plurality of preview images captured by the user may be simultaneously displayed in the first preview area from which the user may select the target image to be sent. As shown in FIG. 5, in response to a click operation of the user on a preview image, the preview image corresponding to the click operation is determined as the target image, which can be displayed in a special manner. For example, the target image may be displayed with bold borders. In some embodiments of the present disclosure, a plurality of preview images can be determined as target images by selecting these images from the preview images.

In some embodiment of the present disclosure, as shown in FIG. 5, only a view-only-once control 17 and a sending control 19 are displayed in the first preview area. In response to a trigger operation of the user on the view-only-once control 17, the target image is set to be viewed for only once. As a result, the preview image is recalled after it is viewed on the information receiving end. For a detailed description about the view-only-once, reference can be made to the description of the above embodiments, which will not be repeated in the embodiments.

In some embodiments of the present disclosure, in response to a trigger operation on the sending control 19 in the first preview area, the target image can be directly sent to the information receiving end and displayed in the information interaction area, thereby achieving instant shooting and sending. After the target image is acquired, it can be directly displayed in a first size within an input box. Moreover, input information entered by the user can be received. Then, the target image and the input information are sent as a session message to the information receiving end.

In the embodiments of the present disclosure, a method is provided for selecting an image from the first preview area and sending it to the information receiving end, wherein preview images are displayed in a half-screen format, making it easier for the user to select an image and send it to the other party, thereby improving the user experience.

In some embodiments of the present disclosure, the information interaction area is used for an interaction between the current user and a user at the information receiving end.

In the embodiments of the present disclosure, interaction information between the current user (i.e., the user at the information sending end) and the user at the information receiving end is displayed in the information interaction area. Specifically, the interaction information may be one or more of text information, image information, video information, an emoji, an online document, an offline document, and other types of information. The information input area is mainly used to receive various interaction information described above.

In some embodiments of the present disclosure, the method further comprises: after acquiring the target image corresponding to the trigger operation, sending the target image to the information receiving end; and displaying the target image in the information interaction area.

In some embodiments of the present disclosure, the target image is acquired and sent to the information receiving end for viewing by a user at the information receiving end. There may be one or more information receiving ends. For example, in a case of a personal session, only one information receiving end can receive the target image. In a case of is a group session, a plurality of information receiving ends in a session group can receive the target image. A transmission method of the target image is specifically limited in the embodiments of the present disclosure.

In some embodiments of the present disclosure, after acquiring the target image, the target image can be directly sent to the information receiving end without any additional operation.

In some embodiments of the present disclosure, the information interaction area comprises an input control and the image acquisition method further comprises: adding the target image to the input control on the information input page, after acquiring the target image corresponding to the trigger operation; and sending the target image to the information receiving end, in response to a sending operation of the current user.

Figure 6:
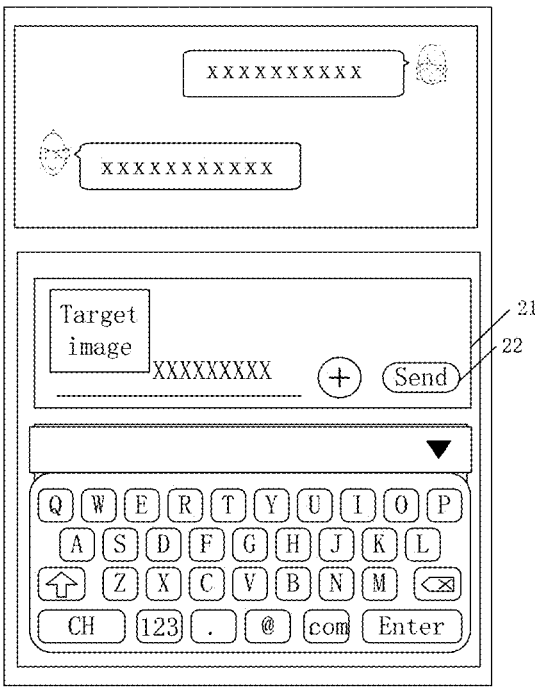
FIG. 6 is a schematic diagram of a target image displayed in an input control according to some embodiments of the present disclosure.

In some embodiments of the present disclosure, as shown in FIG. 6, after acquiring the target image in response to the trigger operation on the information input page, the target image is added as an element to an input control 21. In response to a trigger operation of the user on the sending control 22, the target image is sent to the information receiving end.

In some embodiments of the present disclosure, the method further comprises: acquiring input information, in response to an input operation of the current user on the input control, after acquiring the target image corresponding to the trigger operation; and sending the target image and the input information as a session message to the information receiving end.

As shown in FIG. 6, after acquiring the target image in response to the trigger operation on the information input page, the target image is added to the input control 21 as an element. In response to the input operation of the user on the input control 21, input information is acquired. The input operation may comprise acquiring text information entered by the user in response to click operations of the user on a virtual keyboard shown in FIG. 6. The input operation may also comprise displaying multiple emojis on an emoji panel in response to a trigger operation of the user on the emoji panel. In response to a selection operation on an emoji, determining the selected emoji as input information and displaying it in the input control 21. In some embodiments, in response to the trigger operation of the user on the sending control 22, the target image and the input information are sent as a session message to the information receiving end.

In the embodiments of the present disclosure, the preview image and the input information are sent as a session message to the information receiving end, which can facilitate the user to add corresponding description information for the preview image to establish correspondence between the image and the description information, thereby facilitating understanding by the user at the information receiving end.

In some embodiments of the present disclosure, the information interaction area comprises an information presentation area, and the target image sent to the information receiving end is presented in the information presentation area.

Figure 7:
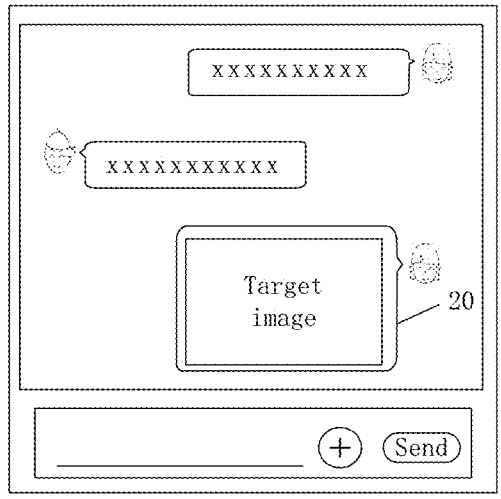
FIG. 7 is a schematic diagram of a target image displayed in an information interaction area according to some embodiments of the present disclosure.

In some embodiment of the present disclosure, as shown in FIG. 7, the information interaction area comprises an information presentation area 20. After the target image is sent to the information receiving end, the target image is also displayed in the information presentation area 20 of the information sending end. For example, the information presentation area 20 may be an information card.

In some embodiments of the present disclosure, a size of the target image displayed in the information presentation area is proportional to the size of the first preview area.

Figure 8:
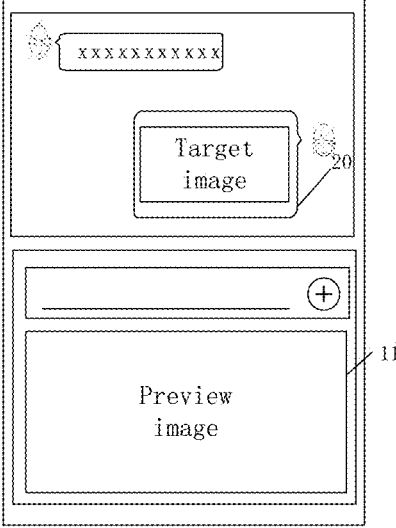
FIG. 8 is a schematic diagram showing a display size of a target image according to some embodiments of the present disclosure.

As shown in FIG. 8, the size of the target image displayed in the information presentation area 20 is proportional to the size of the first preview area 11. That is, a aspect ratio of the target image is the same as that of the first preview area. After reducing the target image in the first preview area to a certain proportion, the target image displayed in the information interaction area is obtained. This can prevent distortion of the photographed image.

In some embodiments of the present disclosure, the preview image is displayed in the input control at a first size, and is displayed in the information presentation area at a second size, the first size being smaller than the second size.

In the embodiments of the present disclosure, both the first size and the second size can be specified according to actual situations. Note that regardless of the first size or the second size, only a display size of the image is adjusted, without changing the aspect ratio and size of the original image.

As shown in FIG. 6, the target image is displayed in the first size in the input control 21. As shown in FIG. 7, the preview image is displayed in the second size in the information presentation area 20. The first size is smaller than the second size. For example, at least a portion of the target image is displayed in input control 21.

In some embodiments of the present disclosure, after sending the target image and the input information as the session message to the information receiving end, the target image and the input information can be displayed in a same information card or in two different information cards in an information interaction interface, which is not specifically limited in the embodiments of the present disclosure.

In the embodiments of the present disclosure, the target image in the input control is displayed in a small size to occupy a relatively small portion of the screen, making it convenient for the user to view other information on the information input page.

Figure 9:
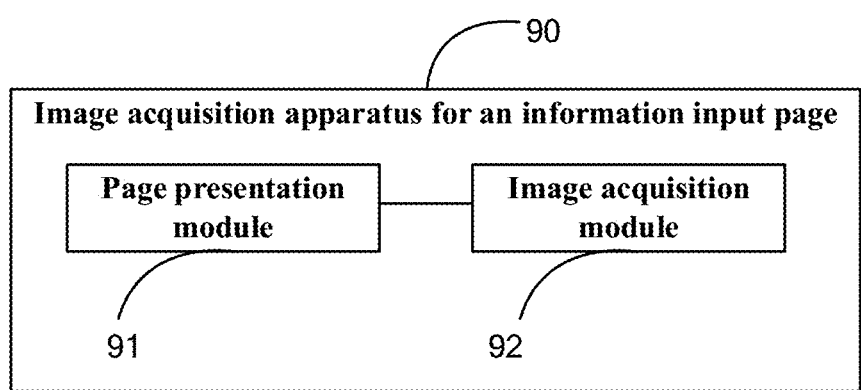
FIG. 9 is a schematic structure diagram of an image acquisition apparatus for an information input page according to some embodiments of the present disclosure.

FIG. 9 is a schematic structure diagram of an image acquisition apparatus for an information input page provided in some embodiments of the present disclosure. The embodiments can be applicable to previewing an image on the information input page. This image acquisition apparatus for the information input page can be implemented in software and/or hardware, and can be configured in an electronic device.

As shown in FIG. 9, the image acquisition apparatus 90 for the information input page provided in the embodiments mainly comprises: a page presentation module 91 and an image acquisition module 92.

The page presentation module 91 is configured to present the information input page in a first preview mode, in response to a first operation on the information input page, wherein the information input page in the first preview mode comprises an information interaction area and a first preview area, the first preview area is configured to display a preview image added by a current user and a size of the first preview area is smaller than a size of the information input page; and the image acquisition module 92 is configured to acquire a target image corresponding to a trigger operation, in response to the trigger operation on the information input page, wherein the target image is configured to be presented in the information interaction area.

In some embodiments of the present disclosure, the page presentation module 91 is configured to replace a portion of the information interaction area of the information input page with the first preview area and reducing a size of the information interaction area, in response to the first operation on the information input page.

In some embodiments of the present disclosure, the image acquisition apparatus further comprises: a preview mode switching module configured to switch the information input page from the first preview mode to a second preview mode, in response to a second operation on the first preview area, in a case where the information input page is presented in the first preview mode; and the page presentation module 91 is further configured to display the preview image in a second preview area, wherein a size of the second preview area is equal to the size of the information input page.

In some embodiments of the present disclosure, the second operation comprises at least one of: a trigger operation on a target control in the first preview area, or a slide operation in a first direction in the first preview area.

In some embodiments of the present disclosure, the image acquisition apparatus further comprises: a preview mode disabling module configured to replace the first preview area of the information input page with at least a portion of the information interaction area and increase a size of the information interaction area, in response to a third operation on the information input page.

In some embodiments of the present disclosure, the third operation comprises at least one of: a trigger operation on a preset control in the information interaction area, or a slide operation in a second direction in the first preview area.

In some embodiments of the present disclosure, the information interaction area is configured for an interaction between the current user and a user at an information receiving end.

In some embodiments of the present disclosure, the image acquisition apparatus further comprises: a target image sending module configured to send the target image to the information receiving end, after acquiring the target image corresponding to the trigger operation; and the page presentation module 91 is further configured to display the target image in the information interaction area.

In some embodiments of the present disclosure, the information interaction area comprises an input control and the target image addition module is configured to add the target image to the input control on the information input page, after acquiring the target image corresponding to the trigger operation; and the target image sending module is further configured to send the target image to the information receiving end, in response to a sending operation of the current user.

In some embodiments of the present disclosure, an input information acquisition module is configured to acquire input information, in response to an input operation of the current user on the input control, after acquiring the target image corresponding to the trigger operation; and the target image sending module is further configured to send the target image and the input information as a session message to the information receiving end.

In some embodiments of the present disclosure, the information interaction area comprises an information presentation area, and the target image sent to the information receiving end is presented in the information presentation area.

In some embodiments of the present disclosure, the apparatus further comprises: a target image recalling module configured to set a view number for the target image, in response to a trigger operation on a view number control in the first preview area, wherein the view number is configured to recall the target image in response to a number of times the target image that has been viewed on the information receiving end reaching the view number.

In some embodiments of the present disclosure, the image acquisition module 92 is configured to control a camera to capture the preview image as the target image, in response to a trigger operation on a shooting control on the information input page.

In some embodiments of the present disclosure, a size of the target image displayed in the information presentation area is proportional to the size of the first preview area.

In some embodiments of the present disclosure, the image acquisition module 92 is configured to start to record a video, in response to a long press operation on the shooting control; stop recording the video, in response to detecting that the long press is completed; and acquire a target video corresponding to the long press operation.

The image acquisition apparatus for the information input page provided in the embodiments can execute the steps of the image acquisition method for the information input page provided in the embodiments of the present disclosure. The steps involved and the beneficial effect achieved will not be described in detail.

Figure 10:
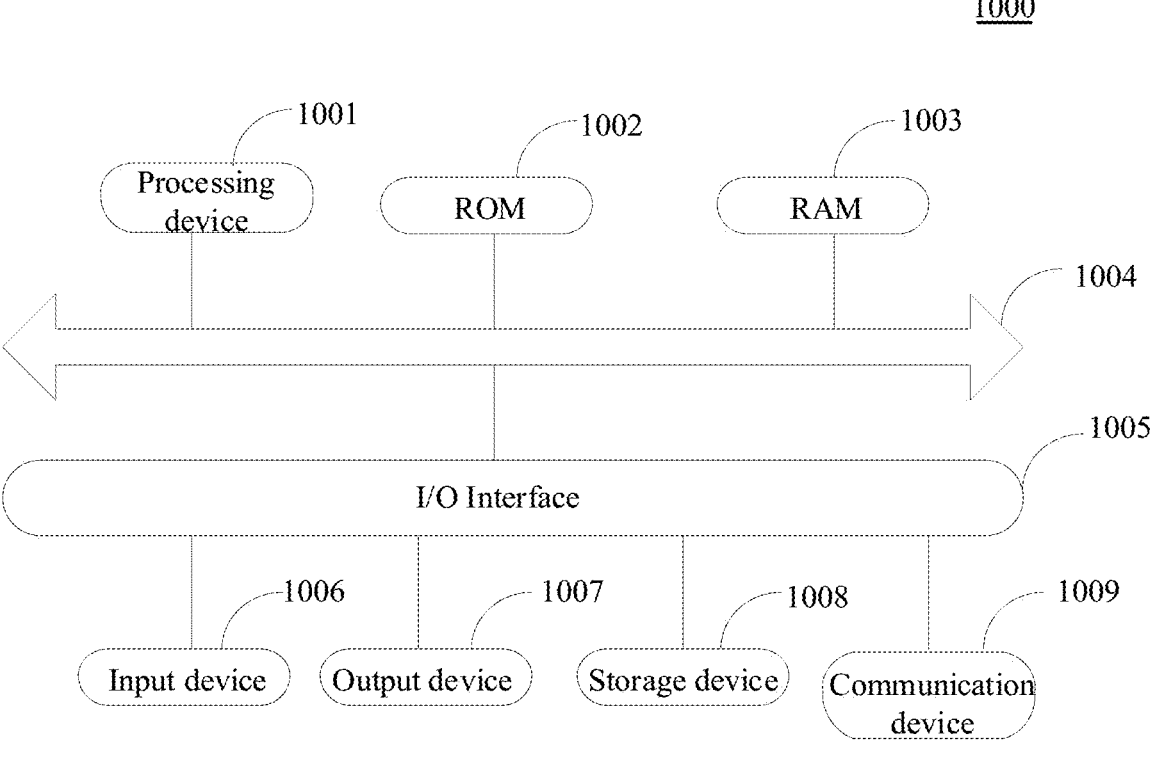
FIG. 10 is a schematic structure diagram of an electronic device according to some embodiments of the present disclosure.

FIG. 10 is a schematic structure diagram of an electronic device according to an embodiment of the present disclosure. Referring to FIG. 10, a schematic structural diagram of an electronic device 1000 suitable for implementing the embodiments of the present disclosure is shown. The electronic device 1000 of the embodiment of the present disclosure may comprise, but not limited to, a mobile terminal such as a mobile phone, a notebook computer, a digital broadcast receiver, a PDA (Personal Digital Assistant), a PAD (tablet computer), a PMP (Portable Multimedia Player), an on-board terminal (such as an on-board navigation terminal), or a wearable electronic device, and a fixed terminal such as a digital TV, a desktop computer, or a smart-home device. The electronic device shown in FIG. 10 is merely an example and should not impose any limitation on the function and scope of the embodiments of the present disclosure.

As shown in FIG. 10, the electronic device 1000 may comprise a processing device (e.g., a central processing unit, a graphics processor) 1001, which may perform various appropriate actions and processes to implement the image rendering method of the embodiment of the present disclosure according to a program stored in Read Only Memory (ROM) 1002 or a program loaded from storage device 1008 into Random Access Memory (RAM) 1003. In RAM 1003, various programs and data required for the operation of the electronic device 1000 are also stored. The processing device 1001, ROM 1002, and RAM 1003 are connected to each other through a bus 1004. An input/output (I/O) interface 1005 is also connected to the bus 1004.

Generally, the following devices can be connected to the I/O interface 1005: input devices 1006 comprising, for example, a touch screen, a touch pad, a keyboard, a mouse, a camera, a microphone, an accelerometer, a gyroscope, etc.; output devices 1007 comprising a liquid crystal display (LCD), a speaker, a vibrator, etc.; a storage device 1008 such as a magnetic tape, a hard disk, etc.; and a communication device 1009. The communication device 1009 enables the terminal device 1000 to communicate in a wireless or wired manner with other devices to exchange data. Although FIG. 10 shows the electronic device 1000 with various components, it should be understood that it is not required to implement or have all of these components. Alternatively, more or fewer components can be implemented or provided.

In particular, according to an embodiment of the present disclosure, the processes described above with reference to the flowchart can be implemented as a computer software program. For example, an embodiment of the present disclosure comprises a computer program product, which comprises a computer program carried on a non-transitory computer readable medium, and containing program code for executing the method shown in the flowchart to implement the above image processing method. In such an embodiment, the computer program may be downloaded and installed from the network through the communication device 1009, or installed from the storage device 1008, or from the ROM 1002. When the computer program is executed by the processing device 1001, the above functions defined in the method of the embodiment of the present disclosure are performed.

It should be noted that the computer readable medium in the present disclosure may be a computer readable signal medium or a computer readable storage medium, or any combination of thereof. The computer readable storage medium can be, for example, but not limited to, an electronic, magnetic, optical, electromagnetic, infrared, or semiconductor system, apparatus, or device, or any combination of the above. More specific examples of the computer readable storage medium may comprise, but are not limited to: electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing. In the present disclosure, a computer readable storage medium can be any tangible medium that can contain or store a program, which can be used by or in connection with an instruction execution system, apparatus or device. In the present disclosure, a computer readable signal medium may comprise a data signal that is propagated in the baseband or as part of a carrier, carrying computer readable program code. Such propagated data signals can take a variety of forms comprising, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code embodied on a computer readable medium can be transmitted by any suitable medium, comprising but not limited to wire, fiber optic cable, RF (radio frequency), etc., or any suitable combination of the foregoing.

In some embodiments, a client and a server can communicate using any currently known or future developed network protocol such as HTTP (Hyper Text Transfer Protocol), and can be interconnected by any form or medium of digital data communication, e.g., a communication network. Examples of communication networks comprise a local area network ("LAN") and a wide area network ("WAN"), the Internet, and end-to-end networks (for example, ad hoc end-to-end networks), as well as any currently known or future developed networks.

The above computer readable medium may be comprised in the electronic device described above; or it may exist alone without being assembled into the electronic device.

The computer readable medium carries one or more programs that, when executed by the terminal device, cause the terminal device to present the information input page in a first preview mode, in response to a first operation on the information input page, wherein the information input page in the first preview mode comprises an information interaction area and a first preview area, the first preview area is configured to display a preview image added by a current user and a size of the first preview area is smaller than a size of the information input page; and acquire a target image corresponding to a trigger operation, in response to the trigger operation on the information input page, wherein the target image is configured to be presented in the information interaction area.

Optionally, when the terminal device performs the above one or more programs, the terminal device may also perform other steps in the above embodiments.

The computer program code for executing operations of the present disclosure may be complied by any combination of one or more program design languages, the program design languages comprising object-oriented program design languages, such as Java, Smalltalk, C++, etc., as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the latter circumstance, the remote computer may be connected to the user computer through various kinds of networks, comprising local area network (LAN) or wide area network (WAN), or connected to external computer (for example using an internet service provider via Internet).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. It should also be noted that, in some alternative implementations, the functions noted in the block may occur out of the order noted in the drawings. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The units involved in the embodiments described in the present disclosure can be implemented in software or hardware. Wherein, the names of the units do not constitute a limitation on the units themselves under certain circumstances.

The functions described above may be performed at least in part by one or more hardware logic components. For example, without limitation, exemplary types of hardware logic components that can be used comprise: Field Programmable Gate Array (FPGA), Application Specific Integrated Circuit (ASIC), Application Specific Standard Product (ASSP), System on Chip (SOC), Complex Programmable Logic Device (CPLD), etc.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combination of thereof. More specific examples of the machine-readable storage medium may comprise electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing.

According to one or more embodiments of the present disclosure, the present disclosure provides an image acquisition method for an information input page, comprising: presenting the information input page in a first preview mode, in response to a first operation on the information input page, wherein the information input page in the first preview mode comprises an information interaction area and a first preview area, the first preview area is configured to display a preview image added by a current user and a size of the first preview area is smaller than a size of the information input page; and acquiring a target image corresponding to a trigger operation, in response to the trigger operation on the information input page, wherein the target image is configured to be presented in the information interaction area.

According to one or more embodiments of the present disclosure, the present disclosure provides an image acquisition method for an information input page, wherein presenting the information input page in a first preview mode (i.e., displaying an information interaction area and a first preview area on the information input page) in response to a first operation on the information input page comprises: replacing a portion of the information interaction area of the information input page with the first preview area and reducing a size of the information interaction area, in response to the first operation on the information input page.

According to one or more embodiments of the present disclosure, the present disclosure provides an image acquisition method for an information input page, further comprising: switching the information input page from the first preview mode to a second preview mode, in response to a second operation on the first preview area, in a case where the information input page is presented in the first preview mode; and displaying the preview image in a second preview area, wherein a size of the second preview area is equal to the size of the information input page.

According to one or more embodiments of the present disclosure, the present disclosure provides an image acquisition method for an information input page, wherein the second operation comprises at least one of: a trigger operation on a target control in the first preview area, or a slide operation in a first direction in the first preview area.

According to one or more embodiments of the present disclosure, the present disclosure provides an image acquisition method for an information input page, wherein the switching the information input page from the first preview mode to a second preview mode, in response to a second operation on the first preview area comprises: obtaining a slide distance corresponding to the slide operation in the first direction, in response to the slide operation in the first direction in the first preview area; and switching the information input page from the first preview mode to the second preview mode, in response to the slide distance corresponding to the slide operation in the first direction exceeding a preset distance threshold.

According to one or more embodiments of the present disclosure, the present disclosure provides an image acquisition method for an information input page, further comprising: replacing the first preview area of the information input page with at least a portion of the information interaction area and increasing a size of the information interaction area, in response to a third operation on the information input page.

According to one or more embodiments of the present disclosure, the present disclosure provides an image acquisition method for an information input page, wherein the third operation comprises at least one of: a trigger operation on a preset control in the information interaction area, or a slide operation in a second direction in the first preview area.

According to one or more embodiments of the present disclosure, the present disclosure provides an image acquisition method for an information input page, wherein the replacing the first preview area of the information input page with at least a portion of the information interaction area and increasing a size of the information interaction area, in response to a third operation on the information input page comprises: obtaining a slide distance corresponding to the slide operation in the second direction, in response to the slide operation in the second direction in the first preview area; and replacing the first preview area of the information input page with at least the portion of the information interaction area and increasing the size of the information interaction area, in response to the slide distance corresponding to the slide operation in the second direction exceeding a preset distance threshold.

According to one or more embodiments of the present disclosure, the present disclosure provides an image acquisition method for an information input page, wherein the information interaction area is configured for an interaction between the current user and a user at an information receiving end.

According to one or more embodiments of the present disclosure, the present disclosure provides an image acquisition method for an information input page, wherein the method further comprises: sending the target image to the information receiving end, after acquiring the target image corresponding to the trigger operation; and displaying the target image in the information interaction area.

According to one or more embodiments of the present disclosure, the present disclosure provides an image acquisition method for an information input page, wherein the information interaction area comprises an input control, and the image acquisition method further comprises: adding the target image to the input control on the information input page, after acquiring the target image corresponding to the trigger operation; and sending the target image to the information receiving end, in response to a sending operation of the current user.

According to one or more embodiments of the present disclosure, the present disclosure provides an image acquisition method for an information input page, wherein the method further comprises: acquiring input information, in response to an input operation of the current user on the input control, after acquiring the target image corresponding to the trigger operation; and sending the target image and the input information as a session message to the information receiving end.

According to one or more embodiments of the present disclosure, the present disclosure provides an image acquisition method for an information input page, wherein the information interaction area comprises an information presentation area, and the target image sent to the information receiving end is presented in the information presentation area.

According to one or more embodiments of the present disclosure, the present disclosure provides an image acquisition method for an information input page, wherein the target image is displayed in the input control at a first size, and is displayed in the information presentation area at a second size, and the first size is smaller than the second size.

According to one or more embodiments of the present disclosure, the present disclosure provides an image acquisition method for an information input page, further comprising: setting a view number for the target image, in response to a trigger operation on a view number control in the first preview area, wherein the view number is configured to recall the target image in response to a number of times the target image that has been viewed on the information receiving end reaching the view number.

According to one or more embodiments of the present disclosure, the present disclosure provides an image acquisition method for an information input page, wherein the acquiring a target image corresponding to a trigger operation, in response to the trigger operation on the information input page comprises: controlling a camera to capture the preview image as the target image, in response to a trigger operation on a shooting control on the information input page.

According to one or more embodiments of the present disclosure, the present disclosure provides an image acquisition method for an information input page, wherein a size of the target image displayed in the information presentation area is proportional to the size of the first preview area.

According to one or more embodiments of the present disclosure, the present disclosure provides an image acquisition method for an information input page, wherein the acquiring a target image corresponding to a trigger operation, in response to the trigger operation on the information input page comprises: starting to record a video, in response to a long press operation on the shooting control; stopping recording the video, in response to detecting that the long press is completed; and acquiring a target video corresponding to the long press operation.

According to one or more embodiments of the present disclosure, the present disclosure provides an image acquisition apparatus for an information input page, comprising: a page presentation module configured to present the information input page in a first preview mode, in response to a first operation on the information input page, wherein the information input page in the first preview mode comprises an information interaction area and a first preview area, the first preview area is configured to display a preview image added by a current user and a size of the first preview area is smaller than a size of the information input page; and an image acquisition module configured to acquire a target image corresponding to a trigger operation, in response to the trigger operation on the information input page, wherein the target image is configured to be presented in the information interaction area.

According to one or more embodiments of the present disclosure, the present disclosure provides an image acquisition apparatus for an information input page, wherein the page presentation module is particularly configured to replace a portion of the information interaction area of the information input page with the first preview area and reducing a size of the information interaction area, in response to the first operation on the information input page.

According to one or more embodiments of the present disclosure, the present disclosure provides an image acquisition apparatus for an information input page, further comprising: a preview mode switching module configured to switch the information input page from the first preview mode to a second preview mode, in response to a second operation on the first preview area, in a case where the information input page is presented in the first preview mode; and the page presentation module is further configured to display the preview image in a second preview area, wherein a size of the second preview area is equal to the size of the information input page.

According to one or more embodiments of the present disclosure, the present disclosure provides an image acquisition apparatus for an information input page, wherein the second operation comprises at least one of: a trigger operation on a target control in the first preview area, or a slide operation in a first direction in the first preview area.

According to one or more embodiments of the present disclosure, the present disclosure provides an image acquisition apparatus for an information input page, further comprising: a preview mode disabling module configured to replace the first preview area of the information input page with at least a portion of the information interaction area and increase a size of the information interaction area, in response to a third operation on the information input page.

According to one or more embodiments of the present disclosure, the present disclosure provides an image acquisition apparatus for an information input page, wherein the third operation comprises at least one of: a trigger operation on a preset control in the information interaction area, or a slide operation in a second direction in the first preview area.

According to one or more embodiments of the present disclosure, the present disclosure provides an image acquisition apparatus for an information input page, wherein the information interaction area is configured for an interaction between the current user and a user at an information receiving end.

According to one or more embodiments of the present disclosure, the present disclosure provides an image acquisition apparatus for an information input page, further comprising: a target image sending module configured to send the target image to the information receiving end, after acquiring the target image corresponding to the trigger operation; and the page presentation module 91 is further configured to display the target image in the information interaction area.

According to one or more embodiments of the present disclosure, the present disclosure provides an image acquisition apparatus for an information input page, wherein the information interaction area comprises an input control and the target image addition module is configured to add the target image to the input control on the information input page, after acquiring the target image corresponding to the trigger operation; and the target image sending module is further configured to send the target image to the information receiving end, in response to a sending operation of the current user.

According to one or more embodiments of the present disclosure, the present disclosure provides an image acquisition apparatus for an information input page, wherein an input information acquisition module is configured to acquire input information, in response to an input operation of the current user on the input control, after acquiring the target image corresponding to the trigger operation; and the target image sending module is further configured to send the target image and the input information as a session message to the information receiving end.

According to one or more embodiments of the present disclosure, the present disclosure provides an image acquisition apparatus for an information input page, wherein the information interaction area comprises an information presentation area, and the target image sent to the information receiving end is presented in the information presentation area.

According to one or more embodiments of the present disclosure, the present disclosure provides an image acquisition apparatus for an information input page, further comprising: a target image recalling module configured to set a view number for the target image, in response to a trigger operation on a view number control in the first preview area, wherein the view number is configured to recall the target image in response to a number of times the target image that has been viewed on the information receiving end reaching the view number.

According to one or more embodiments of the present disclosure, the present disclosure provides an image acquisition apparatus for an information input page, wherein the image acquisition module is particularly configured to control a camera to capture the preview image as the target image, in response to a trigger operation on a shooting control on the information input page.

According to one or more embodiments of the present disclosure, the present disclosure provides an image acquisition apparatus for an information input page, wherein a size of the target image displayed in the information presentation area is proportional to the size of the first preview area.

According to one or more embodiments of the present disclosure, the present disclosure provides an image acquisition apparatus for an information input page, wherein the image acquisition module is particularly configured to start to record a video, in response to a long press operation on the shooting control; stop recording the video, in response to detecting that the long press is completed; and acquire a target video corresponding to the long press operation.

According to one or more embodiments of the present disclosure, the present disclosure provides an electronic device, comprising:

one or more processors;

a memory for storing one or more programs that, when executed by the one or more processors, cause the one or more processors to implement the image acquisition method for an information input page provided by any embodiments of the present disclosure.

According to one or more embodiments of the present disclosure, the present disclosure provides a computer-readable storage medium stored thereon a computer program that, when executed by a processor, implements the image acquisition method for an information input page provided by any embodiments of the present disclosure.

An embodiment of the present disclosure further provides a computer program product comprising computer programs or instructions that, when executed by a processor, cause the processor to implement the image acquisition method for an information input page described above.

An embodiment of the present disclosure further provides a computer program, comprising: instructions that, when executed by a processor, cause the processor to implement the image acquisition method provided by any embodiments of the present disclosure.

Embodiments of the present disclosure provide an image acquisition method and apparatus for an information input page, a device, a storage medium, and a program product, wherein the method comprises: presenting the information input page in a first preview mode, in response to a first operation on the information input page, wherein the information input page in the first preview mode comprises an information interaction area and a first preview area, the first preview area is configured to display a preview image added by a current user and a size of the first preview area is smaller than a size of the information input page; and acquiring a target image corresponding to a trigger operation, in response to the trigger operation on the information input page, wherein the target image is configured to be presented in the information interaction area. In the embodiments of the present disclosure, a portion of the information input page is configured to image previewing and acquisition, so that the image interaction area and the information interaction area can be displayed simultaneously, making it convenient for user viewing and thereby improving the user experience.

The above description is only preferred embodiments of the present disclosure and an explanation of the applied technical principles. Those skilled in the art should understand that the scope of disclosure involved in this disclosure is not limited to the technical solutions formed by the specific combination of the above technical features, and should also cover other technical solutions formed by any combination of the above technical features or their equivalent features without departing from the disclosed concept, for example, technical solutions formed by replacing the above features with technical features having similar functions to (but not limited to) those disclosed in the present disclosure.

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are comprised in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable subcombination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims.

The invention claimed is:

1. An image acquisition method for an information input page, comprising:

presenting the information input page in a first preview mode and displaying a real-time preview image captured by a current user in a first preview area having a first size within the information input page, in response to a trigger operation on a shooting control on the information input page, wherein the information input page in the first preview mode comprises an information interaction area and the first preview area, and the first size of the first preview area is smaller than a size of the information input page;

switching the information input page from the first preview mode to a second preview mode, in response to a slide operation in a first direction in the first preview area, wherein the slide operation is to slide in a direction that expands the first preview area;

displaying the preview image in a second preview area in the second preview mode, wherein a size of the second preview area is greater than the first size of the first preview area, and wherein a size of the preview image in the second preview area is larger than a size of the preview image in the first preview area;

acquiring a target image corresponding to a second trigger operation and displaying the target image as an element in an input control, in response to the second trigger operation on the information input page;

acquiring input information and displaying the input information in the input control, in response to an input operation on the input control, wherein the input information comprises at least one of text information or an emoji; and sending the target image and the input information in the input control as a session message to an information receiving end, in response to a trigger operation on a sending control, wherein the target image is configured to be presented in the information interaction area.

2. The image acquisition method according to claim 1, wherein the presenting the information input page in a first preview mode comprises:

replacing a portion of the information interaction area of the information input page with the first preview area and reducing a size of the information interaction area, in response to the trigger operation on the shooting control on the information input page.

3. The image acquisition method according to claim 1, further comprising switching the information input page from the first preview mode to the second preview mode, in response to a second operation on the first preview area, which comprises:

obtaining a slide distance corresponding to the slide operation in the first direction, in response to the slide operation in the first direction in the first preview area; and switching the information input page from the first preview mode to the second preview mode, in response to the slide distance corresponding to the slide operation in the first direction exceeding a preset distance threshold.

4. The image acquisition method according to claim 1, wherein the target image is displayed in the input control at a first size, and is displayed in an information presentation area at a second size, and the first size of the displayed target image is smaller than the second size.

5. The image acquisition method according to claim 1, further comprising:

setting a view number for the target image, in response to a third trigger operation on a view number control in the first preview area, wherein the view number is configured to recall the target image in response to a number of times, for which the target image has been viewed on the information receiving end, reaching the view number.

6. The image acquisition method according to claim 1, wherein acquiring the target image corresponding to the second trigger operation, in response to the second trigger operation on the information input page comprises:

controlling a camera to capture the preview image as the target image, in response to the second trigger operation on the shooting control on the information input page.

7. The image acquisition method according to claim 1, wherein acquiring the target image corresponding to the second trigger operation, in response to the second trigger operation on the information input page comprises:

starting to record a video, in response to a long press operation on the shooting control;

stopping recording the video, in response to detecting that the long press is completed; and acquiring a target video corresponding to the long press operation.

8. The image acquisition method according to claim 1, further comprising:

replacing the first preview area of the information input page with at least a portion of the information interaction area and increasing a size of the information interaction area, in response to a third operation on the information input page.

9. The image acquisition method according to claim 8, wherein the third operation comprises at least one of: a third trigger operation on a preset control in the information interaction area, or a slide operation in a second direction in the first preview area.

10. The image acquisition method according to claim 8, wherein the third operation is a slide operation in a second direction in the first preview area and replacing the first preview area of the information input page with at least the portion of the information interaction area and increasing the size of the information interaction area, in response to the third operation on the information input page comprises:

obtaining a slide distance corresponding to the slide operation in the second direction, in response to the slide operation in the second direction in the first preview area; and replacing the first preview area of the information input page with at least the portion of the information interaction area and increasing the size of the information interaction area, in response to the slide distance corresponding to the slide operation in the second direction exceeding a preset distance threshold.

11. The image acquisition method according to claim 1, wherein the information interaction area is configured for an interaction between the current user and a user at the information receiving end.

12. The image acquisition method according to claim 11, wherein the information interaction area comprises an information presentation area, and the target image sent to the information receiving end is presented in the information presentation area.

13. The image acquisition method according to claim 12, wherein a size of the target image displayed in the information presentation area is proportional to the first size of the first preview area.

14. An electronic device, comprising:

one or more processors; and a storage device for storing one or more programs that, when executed by the one or more processors, cause the one or more processors to implement an image acquisition method comprising:

presenting an information input page in a first preview mode and displaying a real-time preview image captured by a current user in a first preview area having a first size within the information input page, in response to a trigger operation on a shooting control on the information input page, wherein the information input page in the first preview mode comprises an information interaction area and the first preview area, and the first size of the first preview area is smaller than a size of the information input page;

switching the information input page from the first preview mode to a second preview mode, in response to a slide operation in a first direction in the first preview area, wherein the slide operation is to slide in a direction that expands the first preview area;

displaying the preview image in a second preview area in the second preview mode, wherein a size of the second preview area is greater than the first size of the first preview area, and wherein a size of the preview image in the second preview area is larger than a size of the preview image in the first preview area;

acquiring a target image corresponding to a second trigger operation and displaying the target image as an element in an input control, in response to the second trigger operation on the information input page;

acquiring input information and displaying the input information in the input control, in response to an input operation on the input control, wherein the input information comprises at least one of text information or an emoji; and sending the target image and the input information in the input control as a session message to an information receiving end, in response to a trigger operation on a sending control, wherein the target image is configured to be presented in the information interaction area.

15. The electronic device according to claim 14, wherein presenting the information input page in the first preview mode, in response to the trigger operation on the shooting control on the information input page comprises:

replacing a portion of the information interaction area of the information input page with the first preview area and reducing a size of the information interaction area, in response to the trigger operation on the shooting control on the information input page.

16. The electronic device according to claim 14, wherein the image acquisition method further comprises switching the information input page from the first preview mode to the second preview mode, in response to a second operation on the first preview area, which comprises:

obtaining a slide distance corresponding to the slide operation in the first direction, in response to the slide operation in the first direction in the first preview area; and switching the information input page from the first preview mode to the second preview mode, in response to the slide distance corresponding to the slide operation in the first direction exceeding a preset distance threshold.

17. The electronic device according to claim 14, wherein the one or more programs when executed by the one or more processors, further cause the one or more processors to:

replace the first preview area of the information input page with at least a portion of the information interaction area and increase a size of the information interaction area, in response to a third operation on the information input page.

18. A non-transitory computer-readable storage medium with a computer program stored thereon that, when executed by a processor, causes the processor to:

present an information input page in a first preview mode and display a real-time preview image captured by a current user in a first preview area having a first size within the information input page, in response to a trigger operation on a shooting control on the information input page, wherein the information input page in the first preview mode comprises an information interaction area and the first preview area, and the first size of the first preview area is smaller than a size of the information input page;

switch the information input page from the first preview mode to a second preview mode, in response to a slide operation in a first direction in the first preview area, wherein the slide operation is to slide in a direction that expands the first preview area;

display the preview image in a second preview area in the second preview mode, wherein a size of the second preview area is greater than the first size of the first preview area, and wherein a size of the preview image in the second preview area is larger than a size of the preview image in the first preview area;

acquire a target image corresponding to a second trigger operation and display the target image as an element in an input control, in response to the second trigger operation on the information input page;

acquire input information and display the input information in the input control, in response to an input operation on the input control, wherein the input information comprises at least one of text information or an emoji; and send the target image and the input information in the input control as a session message to an information receiving end, in response to a trigger operation on a sending control, wherein the target image is configured to be presented in the information interaction area.

19. The non-transitory computer-readable storage medium according to claim 18, wherein presenting the information input page in the first preview mode, in response to the trigger operation on the shooting control on the information input page comprises:

replacing a portion of the information interaction area of the information input page with the first preview area and reducing a size of the information interaction area, in response to the trigger operation on the shooting control on the information input page.

20. The non-transitory computer-readable storage medium according to claim 18, wherein the computer program also causes the processor to switch the information input page from the first preview mode to the second preview mode, in response to a second operation on the first preview area, wherein switching the information input page comprises:

obtaining a slide distance corresponding to the slide operation in the first direction, in response to the slide operation in the first direction in the first preview area; and switching the information input page from the first preview mode to the second preview mode, in response to the slide distance corresponding to the slide operation in the first direction exceeding a preset distance threshold.

* * * * *